United States Patent [19]

Compton

[11] Patent Number: 4,921,073
[45] Date of Patent: May 1, 1990

[54] METHOD AND APPARATUS FOR LUBRICATING THE SHAKER HEADS OF A TREE SHAKING HARVESTER

[76] Inventor: Ira Compton, 2434 Dayton Rd., Chico, Calif. 95928

[21] Appl. No.: 419,457

[22] Filed: Oct. 10, 1989

[51] Int. Cl.⁵ ............................................. F01M 9/06
[52] U.S. Cl. ................................... 184/11.2; 184/28; 56/340.1
[58] Field of Search ............ 56/340.1, DIG. 11, 12.2; 184/6.14, 15.1, 26, 38.1, 8, 11.1, 11.2, 28

[56] References Cited

U.S. PATENT DOCUMENTS

| | | | |
|---|---|---|---|
| 1,463,421 | 7/1923 | Hanscom | 184/11.2 |
| 3,335,556 | 8/1967 | Edgemond, Jr. | 56/340.1 |
| 4,521,468 | 6/1985 | Brandt | 56/340.1 |
| 4,757,674 | 7/1988 | Compton | 56/340.1 |

Primary Examiner—Ira S. Lazarus
Assistant Examiner—Alan Cariaso

[57] ABSTRACT

A lubricant filled reservoir attached to a pressuring device is adapted to deliver lubricant from the reservoir to between the padding layers of the shaker heads. The lubricant reservoir and pressuring device in one arrangement of the invention is a manually operated hand-held grease gun attachable to a lubricant fitting which extends through an outer pad of the shaker head to a second layer of padding. In another arrangement of the invention the lubricant reservoir is mounted on the harvester and the pressuring device is either manually or power operable from within the driver's cab. A conduit extending from the mounted lubricant reservoir to the shaker head padding is generally permanently attached as a part of the machine. The driver in this arrangement may grease the shaker heads periodically without stopping the tree shaking process or leaving the driver's cab.

8 Claims, 8 Drawing Sheets

METHOD AND APPARATUS FOR LUBRICATING THE SHAKER HEADS OF A TREE SHAKING HARVESTER

BACKGROUND OF THE INVENTION

1. Field of the Invention

This invention relates to agricultural harvesting equipment in general, and more precisely to lubricating the shaker heads of nut and fruit tree-shaker type harvesting equipment.

2. Description of the Prior Art

Over the years the agricultural industry has developed equipment which quickly harvests the fruit of entire trees in a matter of seconds. One type of fruit and nut tree harvester now widely used has two extending mechanical shaker arms which project outward from the side or front of the harvester. The shaker arms are designed to temporarily clamp against the base of the tree. The shaker arms are then vibrated to shake the fruit or nuts out of the tree. This disclosure is directed at this type of harvesting equipment.

To protect the trees from damage, pliable rubbery padding is attached to the distal ends of the shaker arms. The shaker heads, as they commonly referred to in the industry, each include the distal end of each shaker arm and the pliable padding attached thereon. The padding of a shaker head normally includes a main shaker pad, a sling, and a slip pad. The shaker pad is usually a large cylindrical structure supported on the distal end of the shaker arm by the rectangular, somewhat thin flexible pad referred to as the sling. A second rectangular flexible pad, commonly known as the slip pad, is attached to the upper surface of the shaker arm and draped downward over the exterior of the sling. The lower or bottom side of the slip pad is releasably attached to the bottom surface of the shaker arm by elastic cords and hooks. The elastic cord attachment method of the slip pad allows the bottom of the pad to be unhooked and flipped upward onto the top of the shaker arm to expose the outer surface of the sling. Exposing the sling allows a heat resistant lubricant or grease to be manually applied with a brush between the sling and the slip pad to decrease the friction between the two pads during shaking. The lubricant allows the slip pad to remain substantially stationary against the tree while the majority of the friction created by the vibration of the shaker head is between the sling and the slip pad and not the bark of the tree.

Unfortunately, even with the lubricating grease, friction is still present between the layers of padding during vibration, and consequently heat is developed in the pads. Due to the high temperatures developed by the rapid movement of the sling against the slip pad, the normally thick lubricant becomes thin, and is forced out from between the padding dropping to the ground. The lubricant must be manually reapplied periodically, usually every thirty to sixty minute of continuous tree shaking. If the lubricant is not applied often enough, the heat in the shaker head will continue to rise and concentrate. This concentrated heat causes the materials of the padding to deteriorate rapidly, shortening the life of the expensive pads.

When the harvest of an orchard has been contracted by the tree, or when under adverse weather conditions, time is of the essence in harvesting. Applying lubricant using conventional methods will usually take one man five to ten minutes. The time required to periodically apply lubricant can reduce overall profits since the machine is shut down during the lubricating operation. The tendency to stretch the time between lubrications will and does occur much to the detriment of the padding.

SUMMARY OF THE INVENTION

In practicing the immediate invention, I have devised an improved method and an apparatus for effectively lubricating the shaker heads of shaker type nut and fruit tree harvesting equipment. A lubricant filled reservoir attached to a pressuring device is used to deliver lubricant from the reservoir to between the padding layers of the structured shaker heads. The lubricant reservoir and pressuring device in one arrangement of the invention is a manually operated hand-held grease gun with a hose attachable to the upper end of a grease fitting. The grease fitting extends through the outer most pad layer of the shaker head. A lower end of the grease fitting is positioned to apply the lubricant to the more inward sling of the padding. This arrangement has been found to be much faster and convenient for the operator relative to having to unhook the slip pad and apply the lubricant with a bush. It is also much cleaner for the operator and wastes less lubricant.

In another arrangement of the invention the lubricant reservoir is mounted on the harvester as a permanent part thereof, and the pressuring device is either manually or power operable from within the driver's cab. The hose or line extending from the mounted lubricant reservoir to the shaker head padding is also a permanent part of the machine. The driver in this arrangement may lubricate the shaker heads periodically by activating a switch to operate either an electric or hydraulic pump, or by manually activating a manual pump lever without stopping the tree shaking process. This arrangement when using a non-manually powered pressuring device may utilize a temperature sensing device located in the shaker head to automatically dispense lubricant between the padding layers when sufficient heat is developed.

In yet another arrangement of the invention, the lubricant conduit or tubing is arranged in a circulatory system where a fluid lubricant is pumped through the shaker head padding whereat small metering apertures in the padding dispense some of the lubricant between the pad layers while the remaining fluid lubricant in the head absorbs heat from the padding layers. The fluid lubricant remaining in the conduit and head is then circulated through a remote heat exchanger where the excess heat is extracted from the fluid before being returned to the shaker head. This is a continuous process of both lubricating and cooling the padding of the shaker heads.

My invention makes it much more simple, fast and convenient to keep the padding layers of the shaker head well lubricated. By maintaining a well lubricated shaker head, the heat of the padding is kept down. The lower temperature increases the expected functional life of the shaker head pads and increases the speed at which an orchard can be harvested.

Therefore, it is a primary object of my invention to provide an improved method and apparatus for lubricating the shaker heads of shaker type nut and fruit harvesting equipment to reduce the expense and time required to lubricate between pad layers.

A further object of the invention is to provide an improved method and apparatus for keeping the shaker heads well lubricated during harvesting to increase the expected functional life of the pliable synthetic rubber of the shaker heads.

An even further object of the invention is to provide both an improved method and apparatus which allows the shaker head padding to be lubricated while the padding is in position for tree shaking.

Other objects will become clear from reading descriptions of numbered parts in the remaining specification and comparing them with similarly numbered parts shown in the appended drawings.

BEST MODE FOR CARRYING OUT THE INVENTION

Figure 1:
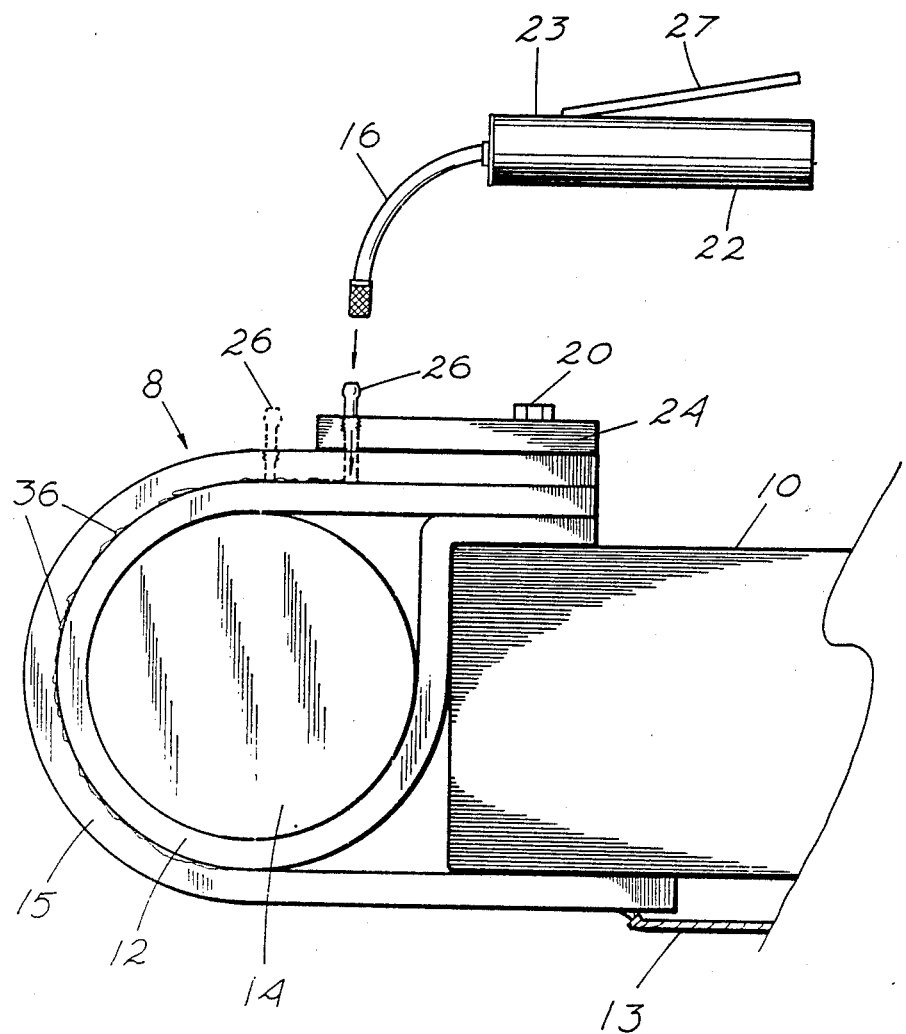
FIG. 1 is a side view of the distal end of one shaker arm. The cylindrical main pad is shown retained by the sling, and the sling is shown covered by the slip pad. A hand-held grease gun is shown about to be attached to a lubricant fitting on the shaker head padding.
Figure 2:
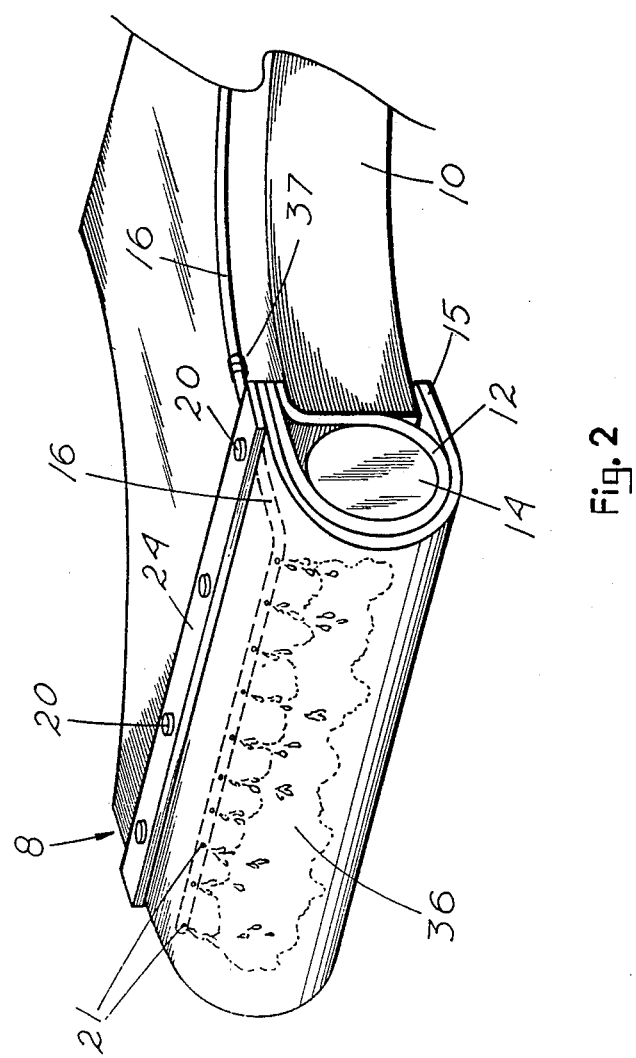
FIG. 2 is a perspective view of the distal end of one shaker arm illustrating a single pressured lubricant line distributing lubricant between the padding layers.
Figure 9:
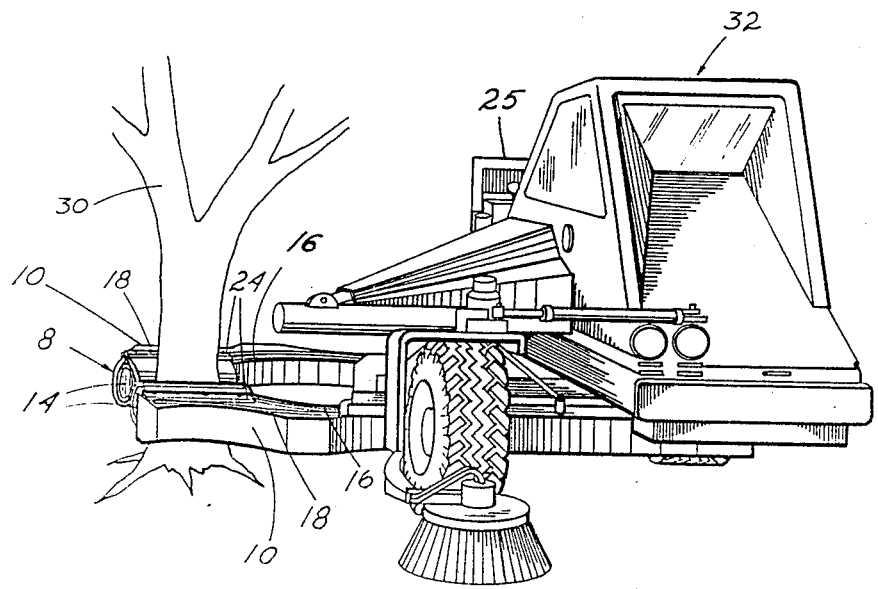
FIG. 9 shows a typical nut and fruit tree shaker in operation. Both shaker arms of the machine are shown clamped around the base of a tree.

Referring now to the drawings in general, and to FIGS. 1 and 2 in particular where one shaker arm 10 is illustrated supporting a shaker head 8. Two shaker arms 10 are normally used on a tree shaking machine 32 designed to grasp the tree 30 at the base for the shaking process, however a few machines use only one shaker arm 10 and shaker head 8 abutted against the tree for shaking. FIG. 9 shows two shaker arms 10 attached to a shaker type nut and fruit tree harvester machine 32. Each shaker arm 10 has a shaker head 8 at the distal end of the arm 10. For the purpose of this disclosure the shaker head consists of the metal distal end of the shaker arm 10 and all the padding layers attached thereto. In most cases the shaker heads 8 in use today use three pads or padding layers consisting of the main shaker pad 14, the sling 12, and slip pad 15. If more or fewer layers of pliable padding are used on the distal ends of shaker arms 10, the invention disclosed herein is still applicable.

Figure 10:
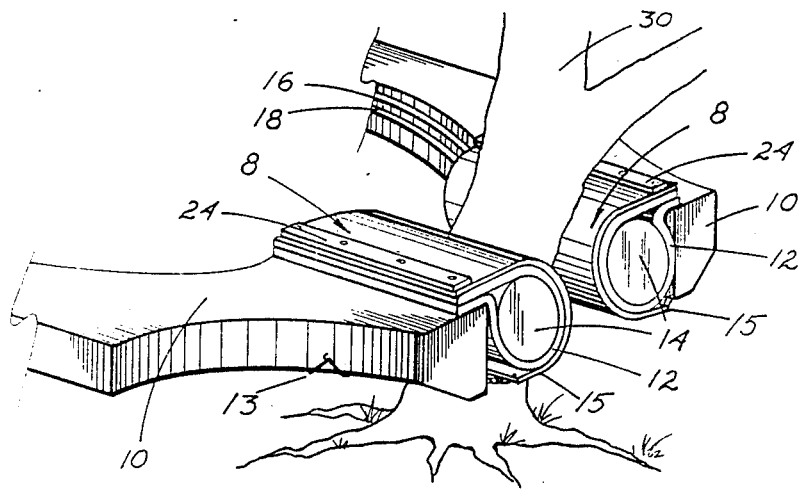
Fig. 10 shows an enlargement of the distal ends of the shaker arms with shaker heads clamped around the base of a tree for the shaking process.

FIG. 1 is a side view of the distal end of one shaker arm 10. The cylindrical main pad 14 is shown retained by the sling 12, and the sling 12 is shown covered by the slip pad 15. A metal sling attachment bar 24 is used at the top of shaker arm 10 to secure the padding layers to the arm 10 with bolts 20. An elastic cord 13 is used on the lower end of the slip pad 15 to releasably attach the slip pad 15 to arm 10. FIG. 10 shows the opposite end of the elastic cord 13 hooked over an attachment hook on the back side of the shaker arm 10. The lower end of slip pad 15 may however be bolted to shaker arm 10 since the principles of my invention eliminate the need to raise the slip pad to apply lubrication.

In FIG. 1 a grease fitting 26 is shown attached to and extending through attachment bar 24. Fitting 26 being a standard commercially available fitting in this application is utilized to form a conduit through bar 24 and slip pad 15. Fitting 26 may obviously terminate at the bottom side of bar 24 and be aligned with an aperture extending through slip pad 15. A standard hand-held grease gun 23 is shown about to be attached to grease fitting 26 by way of input line or hose 16 attached at one end of the gun 23. The grease gun 23 has a manually activated hand lever 27 to allow pressuring of the lubricant from the gun 23 through the attached hose or input line 16. For the purpose of this disclosure, input line 16 is the designation for the line or conduit which carries the lubricant 36 from the lubricant reservoir 22 to the shaker head 8. The manually operable grease gun 23 serves in this application as a lubricant reservoir 22 to store lubricant 36. Once the distal end of the input line 16 of grease gun 23 is temporarily attached to fitting 26, lubricant 36 is dispensed from the gun 23 through fitting 26 to be deposited between slip pad 15 and sling 12. With the vibration and movement caused from shaking trees, the lubrication works its way from where it is deposited between the two pad layers downward and outward between the two pads. For faster distribution of the lubricant 36, two or three fittings 26 may be used spaced apart along bar 24 allowing application of the lubricant in several places along the top between the two padding layers. Also shown in FIG. 1 using dotted lines is a grease fitting 26 affixed to and extending directly through slip pad 15 as an alternative location for the fitting 26.

FIG. 2 is a perspective view of the distal end of one shaker arm 10 illustrating a lubricant input line 16 distributing lubricant 36 between two padding layers of shaker head 8. Input line 16 is shown on the top of shaker arm 10 extending underneath attachment bar 24 between slip pad 15 and sling 12. Input line 16 is shown couple with a releasable tubing connector 37 on top of the shaker arm 10. Connector 37 allows removal of the padding layers of the shaker head 8 and input line 16 therein without removal of the input line 16 from the top of the shaker arm. Also, input line 16 between the two padding layers is made of flexible tubing to eliminate the possibility of the tubing being crushed and permanently closed with the high clamping pressures developed during tree shaking. Input line 16 on top of shaker arm 10 in this application is rigid tubing for durability. Input line 16 between the two padding layers is closed at the terminal end. A plurality of small dispensing apertures 21 are used to allow the lubricant 36 to be distributed between the padding layers. Apertures 21 are properly sized to serve as metering apertures in some cases where a continuous known pressure is applied to lubricant 36 in input line 16 to continuously dispense lubrication. The lubrication may also be applied intermittently if desired.

Figure 3:
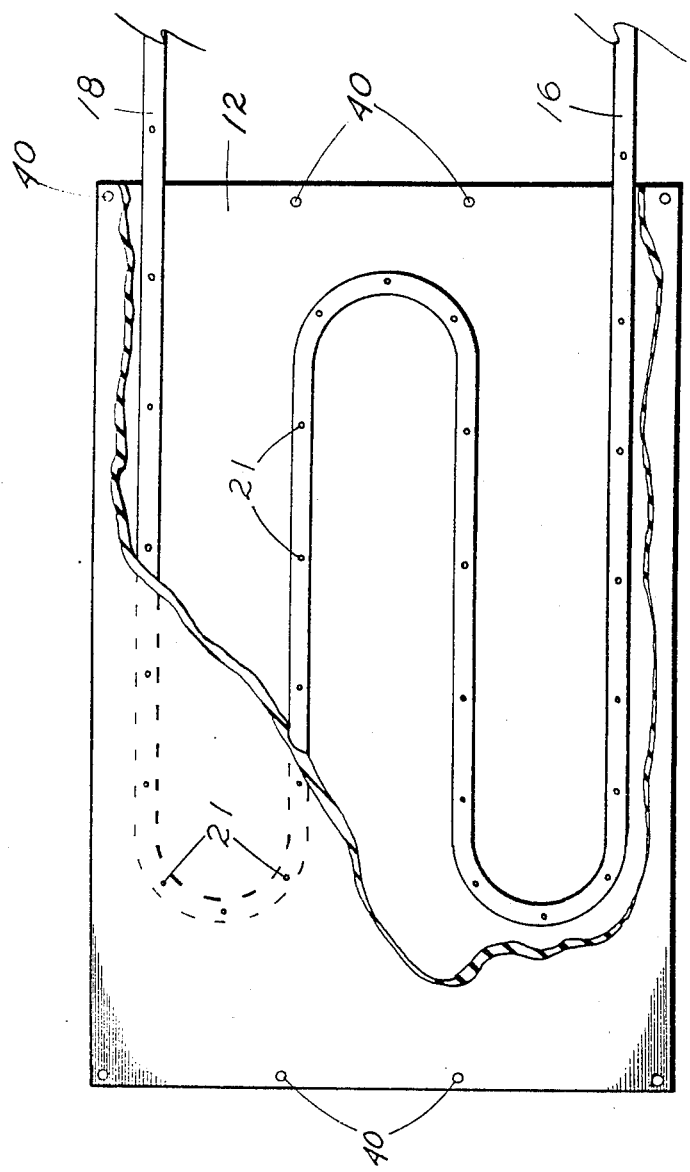
FIG. 3 is a partial cutaway view of a sling having a lubricant line extending through the center. On one side of the lubricant line and the padding are small perforations adapted to allow the lubricant to slowly be metered out of the pad to provide lubrication between padding layers. The sling in this view is arranged for circulation of the lubricant having an input and output side of the tubing, however, the sling would also function within the principles of the invention with just a lubricant input line.

FIG. 3 is a partial cutaway view of a sling 12 having a lubricant line extending through the center of the sling 12. The lubricant line is incased in the material of the sling 12. On one side of the lubricant line and the padding are dispensing apertures 21 adapted to allow the lubricant 36 to be dispensed out of the input line 16 and the sling 12 to provide lubrication between padding layers. The sling 12 in this view is arranged for circulation of the lubricant 16 having an input line 16 and output line 18, however, the sling would also function within the principles of the invention with just input line 16. Circulation of the lubricant 36 will be further explained later in the disclosure. Bolt apertures 40 are also shown at each end of the sling 12 to allow bolting of the pad to shaker arm 10.

Figure 4:
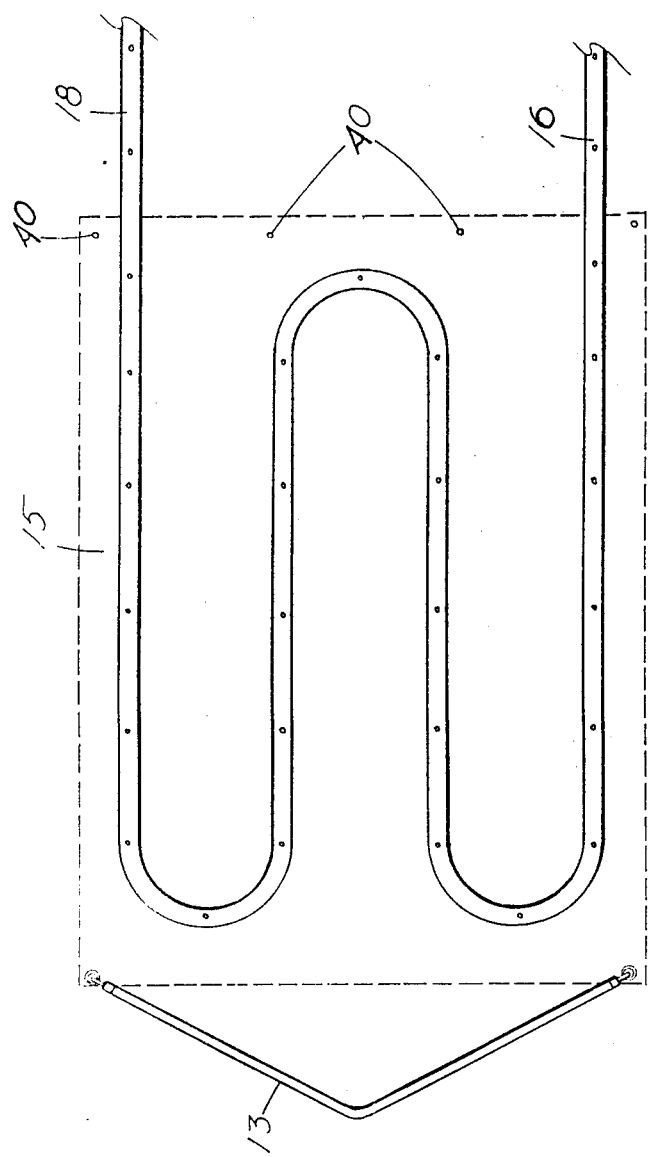
FIG. 4 illustrates a slip pad having a lubricant line extending through the center. On one side of the lubricant line and the padding are small perforations adapted to allow the lubricant to be metered out of the pad to provide lubrication between padding layers. The slip pad in this view is also arranged for circulation of the lubricant having an input and output side of the tubing.

FIG. 4 illustrates a slip pad 15 structured primarily the same as the sling 12 illustrated in FIG. 3. The slip pad 15 in this view is also arranged for circulation of the lubricant 36 having an input and output line 16 and 18. Bolt apertures 40 are shown at one end of the pad 15 and the elastic cord 13 is shown attached to the oppositely disposed end of the pad.

Figure 5:
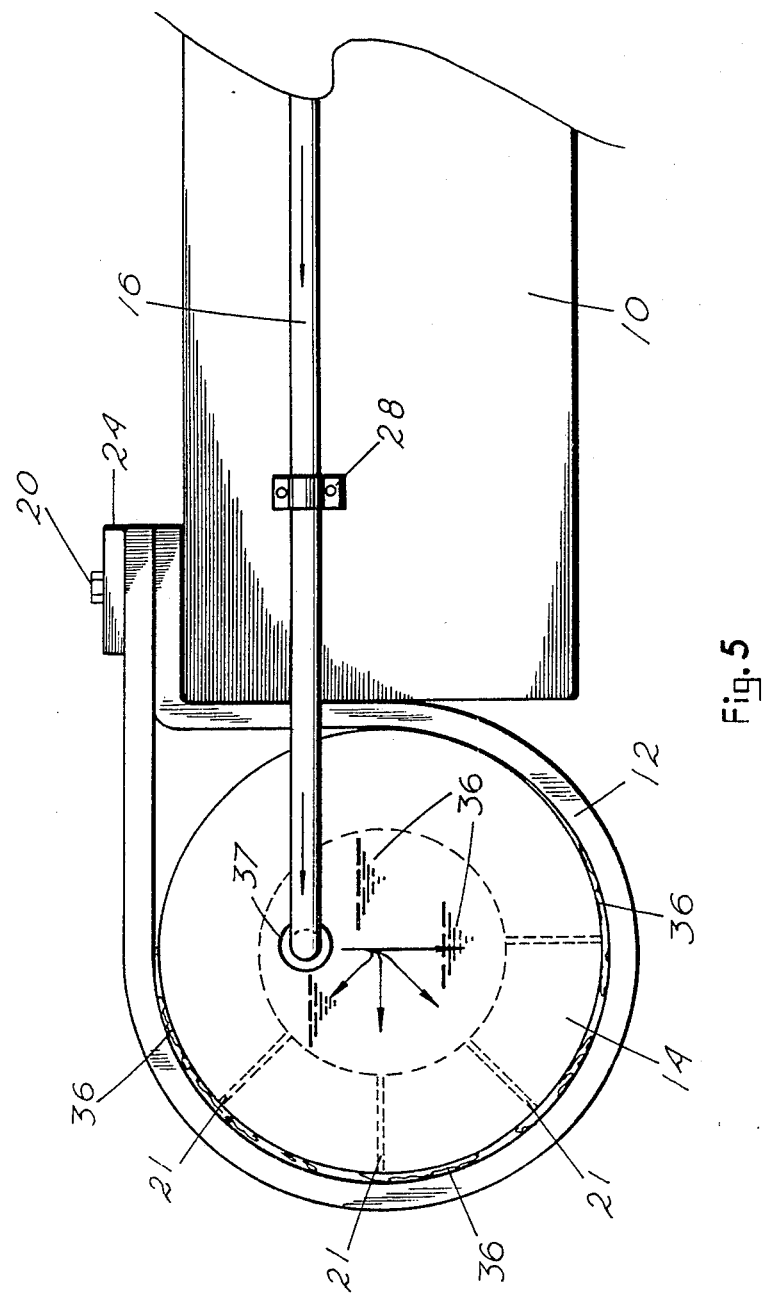
FIG. 5 is a side or end view of a hollow core main shaker pad with metering apertures to distribute lubrication outward onto the sling.

FIG. 5 is a side or end view of a hollow core main shaker pad 14 having an open chamber 38 with metering or dispensing apertures 21 extending from the chamber 38 through the side wall of the pad 14. An input line 16 is shown attached to the side of shaker arm 10 by a conduit strap 28. The input line 16 is attach to the end of the pad 14 by way of a releasable tubing connector 37. With this arrangement, lubricant 36 is pressured into chamber 38 and distributed outward through apertures 21 to between the main pad 14 and the sling 12. In this application it is possible to eliminate the use of the slip pad altogether as shown in the drawing.

Figure 6:
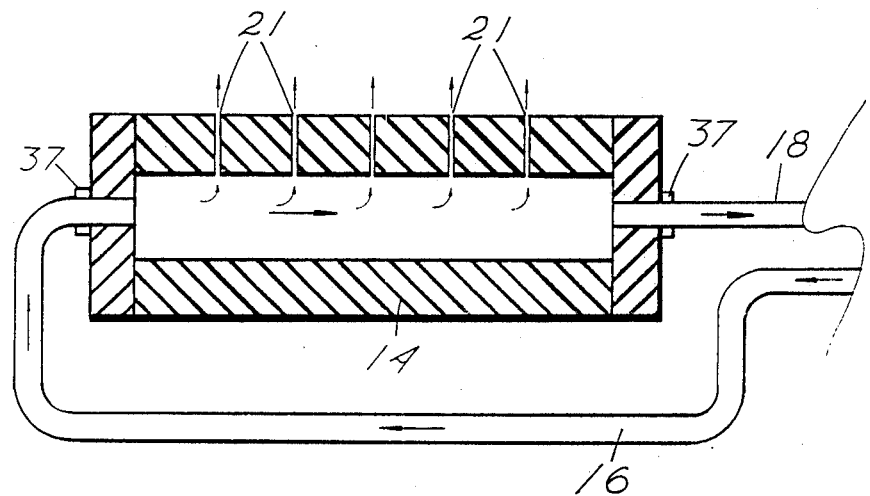
FIG. 6 is a cross sectional view of a similar shaker pad to that shown in FIG. 5 with this particular pad being arranged to allow circulating a thin fluid lubricant through the shaker head to extract heat while at the same time metering lubrication outward onto an outer pad.

FIG. 6 is a cross sectional view of a similar shaker pad to that shown in FIG. 5 with this particular pad being arranged to allow circulating a thin fluid lubricant through the shaker head to extract heat while at the same time metering lubrication outward onto an outer pad.

Figure 7:
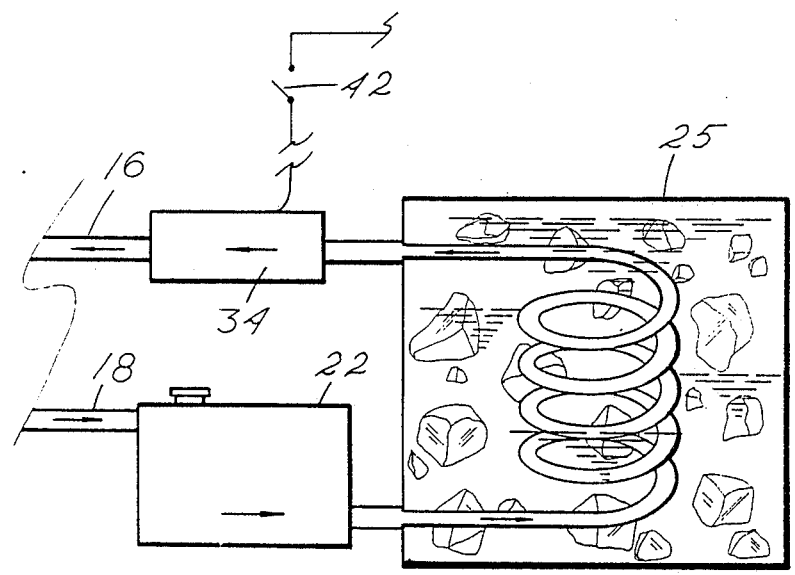
FIG. 7 is an ice bath heat exchanger connected by tubing to a circulation pump and lubricant reservoir. The ice bath is but one example of a possible heat exchanger useful for cooling the fluid lubricant after it has extracted some heat from the shaker head padding.

FIG. 7 illustrates input line 16 and output line 18 attached in a circulatory arrangement which could be hooked-up to the shaker pad 14 shown in FIG. 6 or the sling 12 or slip pad 15 of FIGS. 3 and 4. The use of the circulation system coupled with the ice bath 25 heat exchanger is an ideal arrangement when coupled with the lubricating principles of the invention. This arrangement functions with a fluid lubricant 36 pumped by electric pump 34 through the shaker head 8 whereat dispensing apertures 21 in the padding of the head 8 dispense some of the lubricant 36 between the pad layers while the remaining fluid lubricant in the head 8 absorbs heat from the padding layers. The fluid lubricant 36 remaining in the conduit and head 8 is then circulated through the remote heat exchanger where the excess heat is extracted from the lubricant 36 before being returned to the shaker head 8. The remote heat exchanger in this example is ice bath 25 which would be mounted on the shaker machine 32 as shown in FIG. 9. When this is a continuous process of both lubricating and cooling the padding of the shaker heads 8, dispensing apertures 21 must be properly sized relative to the viscosity of the lubricant 36 and the pressure at which it is pumped. The ice bath 25 is but one example of a possible heat exchanger useful for cooling the lubricant 36 after it has extracted some heat from the shaker head padding. Refrigeration systems and water cooled heat exchangers would also be feasible. Electric pump 34 is powered from the generator of the harvester 32. Electric pump 34 could also be replaced with a hydraulically powered fluid pump.

Illustrated attached to pump 34 is an electric switch 42 which is used to switch the pump 34 on and off. Switch 42 could either be mounted in the cab of the harvester 32 within reach of driver 35 to allow him to switch the pump on periodically, or the switch could be a temperature activated switch placed to sense the temperature in the padding layers of the shaker head 8 where when sufficient heat was developed in the padding, the switch 42 would close completing the electrical circuit to start the pump 34. Upon sufficient lubricating and cooling of the shaker head 8, the switch 42 would then open deactivating pump 34.

Figure 8:
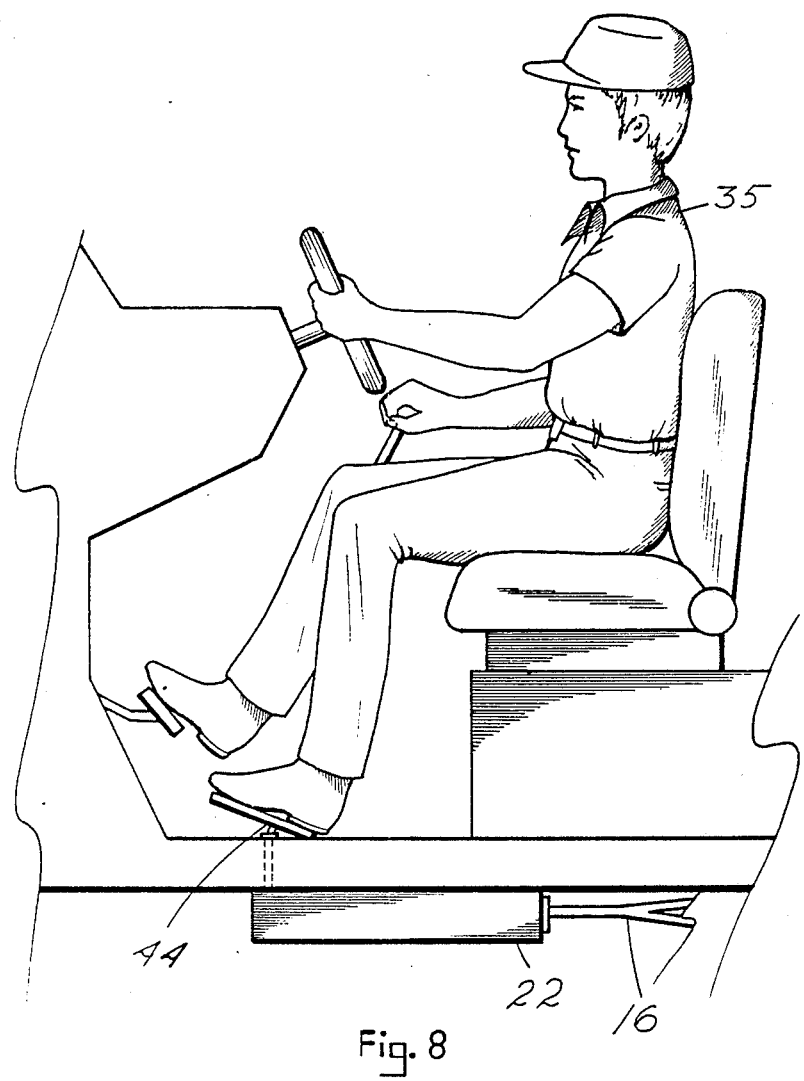
FIG. 8 is an illustration showing the driver in the cab of the tree shaking harvester. The driver is shown operating a foot pedal with his left leg which is attached to the lubricant reservoir underneath the floor panel.

FIG. 8 is an illustration showing the driver 35 in the cab of the tree shaking harvester 32. The driver 35 is shown operating a foot pedal activated pump 44 with his left leg which is attached to the lubricant reservoir 22 underneath the floor panel. This is a mounted grease gun which has been adapted to function with the foot pedal. Input lines 16 are shown extending from the lubricant reservoir 22. Input lines 16 would extend out and connect to one of the non-circulating shaker heads 8 as shown in FIG. 2 or 8.

FIG. 9 shows a typical nut and fruit tree shaker 32 in operation. Both shaker arms 10 of the machine are shown clamped around the base of a tree 30. This view illustrates the use of the lubricating and lubricant circulation system for extracting heat.

FIG. 10 shows an enlargement of the distal ends of the shaker arms 10 with shaker heads 8 of that shown in FIG. 9 clamped around the base of a tree 30 for the shaking process.

It will be obvious to those skilled in the art that each lubricant reservoir 22 needs to be structured with a way to refill the reservoir with lubricant 36. In the grease gun 23 type lubricant reservoirs 22 replaceable cartridges of grease are used. In the tank type lubricant reservoirs 22, a removable lid would normally be used.

It should be noted that although the use of hand-held grease gun 23 does require the driver to stop the machine and get out to apply the lubricant between the padding layers, all forms of the invention allow the padding to be properly lubricated with the padding in the same position as it is used during tree shaking. This is a significant advantage over the past art.

It should also be noted that although I have primarily described the use of fluid lubricants 36 with my invention, it is anticipated that dry powered lubricants such as graphite could be used in some applications of the invention.

Thus having described and shown my invention by example in the drawings and in the specification adequately to allow those skilled in the art to both build and use my invention, it is realized modifications in my invention by those skilled in the art will be possible. Therefore, I will consider any changes made which fall within the intended scope and spirit of the appended claims as my invention.

What I claim as my invention is:

1. A method of lubricating a shaker head of a tree shaking harvester wherein a lubricant is moved from a lubricant reservoir by pressure through a conduit and dispensed between at least two pads of said shaker head with said pads in position for tree shaking.

2. Apparatus for lubricating between padding layers of a shaker head of a tree shaking harvester with said padding layers in position for tree shaking, comprising in combination;

a lubricant reservoir adapted to store a quantity of lubricant;

conduit means between said lubricant reservoir and said padding layers;

means adapted to cause said lubricant to move from said lubricant reservoir through said conduit means to dispense said lubricant between said padding layers.

3. The apparatus of claim 2 wherein said lubricant is a fluid lubricant.

4. The apparatus of claim 2 wherein said lubricant reservoir is mounted on said tree shaking harvester.

5. The apparatus of claim 2 wherein said means to cause said lubricant to move is a manually operated pump.

6. The apparatus of claim 2 wherein said means to cause said lubricant to move is an electrically powered pump.

7. The apparatus of claim 2 wherein said lubricant reservoir is a hand-held said reservoir.

8. The apparatus of claim 7 wherein said conduit means is a hose attached at one end to said hand-held lubricant reservoir with a distal end of said hose adapted to allow temporary attachment to a conduit fitting attached to said shaker head adapted to direct said lubricant between said padding layers.

* * * * *